No. 731,876. PATENTED JUNE 23, 1903.
F. H. ERB, Jr.
DEVICE FOR TRAINING DOGS.
APPLICATION FILED DEC. 12, 1902.
NO MODEL.
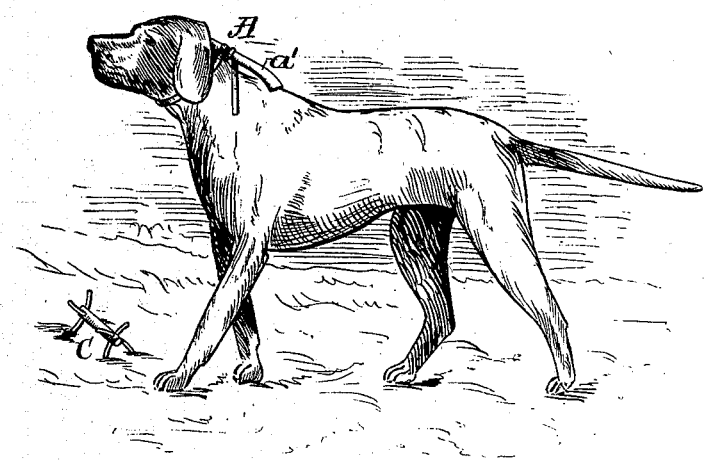
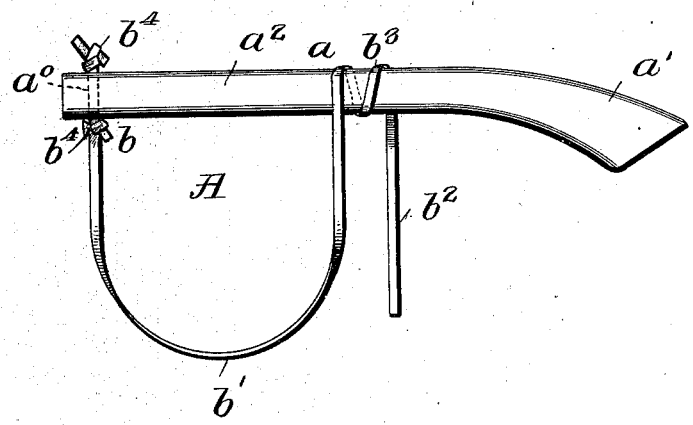
Witnesses
Inventor
F. H. Erb, Jr.
By Wilkinson & Fisher
Attorney No. 731,876. Patented June 23, 1903.

UNITED STATES PATENT OFFICE.

FREDERICK H. ERB, JR., OF LAFAYETTE, INDIANA.

DEVICE FOR TRAINING DOGS.

SPECIFICATION forming part of Letters Patent No. 731,876, dated June 23, 1903.

Application filed December 12, 1902. Serial No. 134,968. (No model.)

*To all whom it may concern:*

Be it known that I, FREDERICK H. ERB, Jr., a citizen of the United States, residing at Lafayette, in the county of Tippecanoe and State of Indiana, have invented certain new and useful Improvements in Devices for Training Dogs; and I do hereby declare the following to be a full, clear, and exact description of the invention, such as will enable others skilled in the art to which it appertains to make and use the same.

My invention relates to devices for facilitating the training of dogs, and is especially adapted for the purpose of breaking in hunting-dogs to properly retrieve, although it is manifest that it may be utilized for teaching pet or trick dogs to pick up articles and carry the same to their masters.

For the further illustration of my device reference is had to the accompanying drawings, in which—

Figure 1 shows the application of my invention as associated with the training of a dog. Fig. 2 is an elevation of the training collar or attachment.

A represents my improved device, which I have designated as a "training-collar." It comprises a rigid yoke member $a$, similar in general contour to the shape of the ordinary hatchet or ax handle, and the flexible band or strap $b$, suitably attached at one end $b'$ to said yoke member and the free end $b^2$ of which is formed into a loop and adapted to be passed around the throat of the animal and wrapped around the yoke member, as illustrated in Fig. 2 at $b^3$.

The yoke member $a$ comprises the enlarged butt-end $a'$, suitably curved and shaped to form a handle for the device, and the elongated portion $a^2$, substantially oval-shaped in cross-section, and although this is the preferred form it is manifest that the yoke member may be of any other desired shape adapted for the purpose.

In the drawings I have illustrated the flexible throat-band $b$ as having one of its ends $b'$ knotted, as at $b^4$, passed through a slot $a^0$ in the yoke member $a$, and again knotted, as at $b^4$, for securing the same to the yoke member; but it is also obvious that any other suitable manner of attaching the throat-band to the yoke member may be employed.

Any suitable retrieving-piece may be used with my improved training-collar; but I preferably employ a retrieving member the body of which may be adjustably supported on legs above the ground, so as to enable the dog in training to readily pick up the same.

In training a dog with my device I first place the retrieving member in the dog's mouth, so as to familiarize him with the same, and then the training-collar is placed around the dog's neck and operated as hereinafter described for making the dog open and close his mouth on the retrieving member. The retrieving member is then placed upon the ground and the dog's head forced down toward it, when by slightly turning the yoke portion of the training-collar with a twist to the rear the flexible loop or band $b$ is tightened around the dog's neck with a slight twitch, which will make him open his mouth and grab the retrieving member, which is then in proximity thereto. This operation may be repeated several times until the dog learns exactly what you want him to do, when the training-collar may be dispensed with. After the dog has learned to properly pick up the retrieving member it is obvious that he can be readily taught to pick up any other article which may be placed before him and finally, if a hunting-dog, to pick up such game as may be placed before him.

As before described and as shown in the drawings, the free end of the flexible member $b$ is so wrapped around the yoke member of the training-collar that when this handle is turned to the rear with a slight twitch the dog is compelled to open his mouth. It will be understood, however, that this operation does not choke the dog, as the handle is not turned rearwardly with a continuous movement, but simply with a slight twitch, which only temporarily tightens the band on the dog's neck and does not in any manner choke the dog.

I believe that there may be other training-collars in use which in operation partially choke the dog into submission or which are provided with spikes thereon for accomplishing the desired end, but which greatly annoy the dog, and I wish it distinctly understood that my invention is for the purpose of avoiding all cruelty.

In properly training a dog and at the same time avoiding cruelty and unkindness everything that can be done to assist the dog's intelligence in understanding what you wish him to do goes a great way in bringing about the best results, besides facilitating the training.

It is obvious that certain modifications might be made in my device without departing from the spirit of my invention; but

What I claim, and desire to secure by Letters Patent of the United States, is—

1. The training-collar, comprising the rigid yoke member and the flexible throat-band attached at one end thereto, and adapted to be wrapped at its other end around the yoke member for the purpose set forth.

2. The training-collar, comprising the rigid yoke member and the flexible throat-band secured at one end to the yoke member and adapted to be wrapped at its other end around same, and a handle integral with said yoke member for giving a slight rearward twitch thereto for opening the dog's mouth for the purpose set forth.

3. The training-collar, comprising the elongated oval-shaped yoke member having an aperture through the outer end thereof and the flexible throat-band passing through said aperture secured at one end therein, the other free end of which is adapted to be passed around the dog's throat and wrapped around said yoke member, and a curved handle formed integral with said elongated yoke member for operating said training-collar to impart a slight twitch thereto for opening the dog's mouth.

In testimony whereof I affix my signature in presence of two witnesses.

FREDERICK H. ERB, JR.

Witnesses:
FREDERICK O. EVANS,
ADAM O. BEHM.